United States Patent Office 3,122,203
Patented Feb. 25, 1964

3,122,203
WELL WASHING PROCESS AND COMPOSITION
Robert R. Hawkins, South Pasadena, Calif., assignor to The Dow Chemical Company, Midland, Mich., a corporation of Delaware
No Drawing. Filed July 23, 1959, Ser. No. 828,941
7 Claims. (Cl. 166—38)

This invention relates to an improved method for drilling and washing wells and is particularly directed to a method for increasing the rate of drilling and for removing mud and the like from contaminated wells and to compositions adapted for use in such processes.

This application is a continuation-in-part of my copending application, Serial No. 721,346, filed March 14, 1958 which in turn is a continuation-in-part of my prior application, Serial No. 639,632, filed February 12, 1957, and now abandoned.

In the drilling of a well such as an oil well, a drilling mud is frequently used to lubricate the drilling bit, to balance formation pressure and to facilitate removal of the drilled cuttings. This drilling mud tends to increase in viscosity if not agitated. The walls of the drilled hole become caked with the drilling mud which solidifies into a hard pack. The presence of this mud pack is undesirable since it decreases the hole diameter, makes well cementing more difficult, and if permitted to remain in place, inhibits the flow of fluid from the producing strata.

Further, some clays encountered in the drilling process tend to swell when in contact with water or other fluid commonly used or encountered in wells. This swelling can cause caving in the hole, increasing the difficulty of drilling and cleaning a well and, in injection wells, decreasing the efficiency of the injection fluid. Further, swollen clay or ground shale may cling to drilling bit parts and bring about conditions which decrease the rate of drilling and/or increase the wear on the bit. In fresh water wells or old oil wells, cavings, mudded sand strata and the like contaminate the fluid or block its flow, requiring a cleaning operation.

Correcting or eliminating these conditions has been expensive, time consuming and difficult. Conventionally, mud packs have been removed from the walls of the well hole by mechanical means such as scrapers, while cavings and sand strata contaminants have been removed by washing with water. This latter method is not satisfactory since the mud particles are not held in suspension in any manner and their removal from the well requires constant and repeated washings.

Accordingly, one of the principal objects of the present invention is to provide a washing process by which a well hole may be cleaned rapidly and economically.

A further object of the present invention is to provide a washing process by which accumulated packed mud may be broken up and removed from the well hole.

A further object of the present invention is to provide a washing process by which clay swelling may be controlled and caving may be reduced.

Another object of this invention is to provide a washing process by which mudded sand strata may be cleaned rapidly and effectively.

Yet another object of the invention is to provide for concurrent washing during drilling operations whereby the tools and strata are maintained clean, caving and drilling fluid losses are decreased and the rate of drilling is increased.

Still another object is to provide compositions having desirable properties for preparing aqueous washing media particularly adapted for use in accomplishing the foregoing and other objects.

Other objects and advantages of the present invention will be apparent from the following detailed description of the materials and process used in preferred embodiments of the present invention.

In accordance with the present invention, I have discovered that a nonionic flocculating agent when introduced into a well hole either during or after drilling will effectively remove caked mud, reduce clay swelling and force into suspension caving or sand strata contaminants. More particularly, I have discovered that when a mixture of a nonionic flocculating agent and a suitable carrying medium such as oil or water is circulated through a well hole, during the drilling thereof, particularly when drilling clay and shale strata, the drilling tools are maintained in a clean condition and an unusually rapid rate of drilling is obtained. Further, I have found that when the above-described mixture is circulated through a well hole having a solid mud pack adhering to the hole walls, the flocculating agent causes the mud to shrink and break away from the hole walls and become suspended in the circulating medium permitting the now loosened mud to be removed by any conventional means, such as pumping, bailing or circulating. In addition I have discovered that compositions which comprise the nonionic flocculating agent in intimate mixture with a detergent or surface-active dispersing agent, with or without additional finely divided inert carriers, are particularly adapted for the speedy preparation of aqueous solutions of the flocculating agent.

The nonionic flocculating agent which I have discovered to be effective in such a mixture is a high-molecular-weight acrylamide polymer hydrolyte. This compound has from about 0.8 percent to about 10 percent of the amide groups of the polymer replaced by carboxyl groups and is characterized by a viscosity of at least 4 centipoises for an aqueous 0.5 percent by weight solution of the polymer hydrolyte. The expression "acrylamide polymer hydrolyte" is inclusive of hydrolytes of the homopolymer of acrylamide and also of hydrolytes of water-soluble copolymers of acrylamide with up to about 15 percent by weight of other suitable monomers such as alkyl esters of acrylic acid and methacrylic acid, methacrylamide, styrene, vinyl acetate, acrylonitrile, methacrylonitrile, vinyl alkyl ethers and vinyl and vinylidene chloride. Such polymers and copolymers may be prepared by polymerizing acrylamide or a mixture of acrylamide with one or more of the other suitable monomers, as set forth above, by known methods, as, for example, by heating an aqueous solution of the monomer or monomers containing a small amount of a peroxide catalyst such as an alkali metal persulfate.

In the determination of the viscosity set forth in the above definition, a 0.5 percent by weight solution of the polymer hydrolyte in distilled water is adjusted to a pH of 3 to 3.5 and a temperature of 21.5° C. and the viscosity is determined with an Ostwald viscosimeter.

Suitable circulating or carrying media which may be used to carry the active agent may be perforating fluids, fracturing fluids, drilling fluids, oil or water. Such fluids, as employed in the present invention, are substantially free of added clay solids in contrast to the so-called drilling muds which contain substantial quantities of added clay. The water need not be pure and can be either fresh, brackish, salt or oilfield brine, depending on the well to be treated.

The quantity of acrylamide polymer hydrolyte necessary to clean any given well may be varied over a wide range, depending on the hole conditions, the depth of the well, the formation pressure, and whether the circulating medium containing the polymer hydrolyte is being employed during or after the actual drilling operation. Generally, the by weight ratio of acrylamide polymer hydrolyte to circulating medium may vary from 1 to 200 to 1 to 2000 in media employed for cleaning wells, particularly when conventional high-solids drilling mud has been employed during the drilling. However, it has been determined that clay swelling in an injection well is reduced when such a well is washed with a mixture having a ratio of 1 part by weight acrylamide polymer hydrolyte to 1,000,000 parts water. It will be apparent, therefore, that the ratio selected in practicing the present invention is dictated more by economic considerations than by the critical nature of the ratio itself. Thus, for washing any given well, increasing the ratio of acrylamide polymer hydrolyte to circulating medium only increases the speed and efficiency of contaminant removal or clay shrinkage. Excessive amounts of the polymer hydrolyte cause marked increases in the viscosity of aqueous circulating media and are generally to be avoided.

Operations in which the mixture of acrylamide polymer hydrolyte and circulating medium is employed for washing during the drilling of the well are different from operations in completed wells. The use of the acrylamide polymer hydrolyte during drilling has been found particularly desirable in situations where the ordinary drilling muds containing added clay or weighting agents are not required. Thus, the method has been found particularly useful in water well drilling, in cable tool drilling and in rotary drilling of the first 1000 to 4000 feet of oil wells, although drilling to greater depths is possible. The amount of acrylamide polymer hydrolyte employed in drilling operations will vary depending on such factors as the type of strata being traversed by the well and the type of well drilling machinery employed. With rotary drill rigs, good results are obtained when employing from about 50 to about 500 parts by weight of avrylamide polymer hydrolyte per million parts of circulating fluid. In such operations, the acrylamide polymer hydrolyte is conveniently introduced in the form of a stock solution consisting of an aqueous solution containing from about 0.25 to about 1 percent by weight of the polymer hydrolyte. This stock solution is piped into the suction side of the pump supplying circulating fluid to the drill string whereby the stock solution is admixed with the circulating fluid in the pump to provide the desired concentration in said circulating fluid. In cable tool drilling, somewhat higher concentrations of from 100 to 1000 parts by weight of acrylamide polymer hydrolyte per million parts of fluid in the well bore are employed. Unless appreciable quantities of water are encountered in the strata being traversed by the well bore, it is generally sufficient, in cable tool drilling, to introduce the polymer hydrolyte solution intermittently after each bailing operation in the well. In situations where appreciable quantities of water collect in the well during the drilling operations, it is generally desirable to introduce a more concentrated solution of acrylamide polymer hydrolyte into the well either continuously or intermittently to maintain the desired concentration of polymer hydrolyte in the drilling zone.

It has been observed that when corrosive circulating media are used in the washing process, corrosion may be inhibited by the addition of suitable cationic detergents well known in the art. The addition of such detergents to the washing mixture increases the efficiency of contaminant removal and prevention of clay swelling.

I have further discovered that the flocculating agent may be used in wells to prevent caving, to shrink clays, to clean sand, and to prevent plugging, and that the method may be used for these purposes when acidizing or fracturing or in cleaning out old wells.

The high-molecular-weight acrylamide polymer hydrolytes employed in the invention are water-soluble. However, some difficulties may be encountered in rapidly dissolving the dry, powdered or flaked polymer product of commerce if special equipment is not available. Such difficulties constitute a particular problem at temporary installations such as are frequently encountered in oilfield operations. These difficulties appear to result from the tendency for the dry particles of polymer hydrolyte to hydrate and swell in water before dissolving. In the resulting swollen condition, the particles may agglomerate into masses which require relatively long standing in water or mechanical agitation or both to complete solution.

It has now been found that the aforementioned difficulties in dissolving the polymer hydrolytes may be avoided by employing a dispersible composition comprising an intimate mixture of a finely divided acrylamide polymer hydrolyte, a surface-active dispersing agent and a free-flowing, anhydrous, organic liquid. In such compositions, it is a further preferred embodiment to include a finely divided inert solid carrier. The composition, with or without the inert solid carrier, is adapted to be dispersed in water with only minimal agitation whereupon a uniform aqueous solution of the polymer hydrolyte is quickly obtained.

In preparing the dispersible composition the ingredients are blended in any suitable fashion. In one mode of operation, the dry polymer hydrolyte is ground to pass a screen of at least 20 meshes to the inch, preferably 50 meshes to the inch, and mechanically mixed with the finely divided inert solid, if the latter is employed. The resulting dry product is dispersed in a solution of a surface-active dispersing agent in a suitable free-flowing, anhydrous, organic liquid to produce the desired dispersible composition. Alternatively, the dry product is dispersed in the organic liquid and the surface-active dispersing agent is subsequently added to the mixture. In a preferred mode of operation, a dry concentrate composition is prepared so that the concentrate may later be mixed with a suitable organic liquid to prepare a water-dispersible composition. In such dry concentrates, the dry, finely ground polymer hydrolyte is mechanically blended with a solid surface-active dispersing agent and with a finely divided inert solid carrier. The resulting concentrate is adapted to be dispersed in an anhydrous, organic liquid to produce a water-dispersible composition. Alternatively and particularly if it is desired to employ a liquid or waxy surface-active agent, the latter is added portionwise with stirring to the finely divided inert solid and the resulting mixture is then blended with the polymer hydrolyte to produce a dry concentrate.

In the water-dispersible compositions good results are obtained when employing from about 0.1 to 4 parts by weight of organic liquid, from about 0.05 to 1 part of surface-active dispersing agent and from 0 to 1 part of finely divided inert solid per part by weight of acrylamide polymer hydrolyte. Preferred compositions contain from 0.2 to 2 parts by weight of organic liquid, from 0.1 to 0.5 part of surface-active dispersing agent and from 0.1 to 0.5 part of finely divided inert solid per part by weight of acrylamide polymer hydrolyte. In dry concentrates, the proportions of ingredients may vary within essentially the same limits as the above, it being understood that the organic liquid is not employed in such concentrates.

Suitable surface-active dispersing agents for use in the compositions include nonionic and anionic wetting and dispersing agents such as long chain alkyl sulfates and sulfonates, fatty acids containing from 8 to 18 carbon atoms and the alkali metal salts thereof, alkylaryl sulfonates, alkyl diphenylether disulfonates, polyoxyalkylene derivatives of amines, amides, alcohols, organic acids, phenols, alkylphenols, glycols and glycol ethers, substituted alkanoyl imidazolene derivatives, sulfated oils and esters, petroleum sulfonates, substituted fatty acid amides and polyoxyethylene derivatives of hexitan esters. For such agents the primary requirement is that they should facilitate the dispersion of the finished composition in water. Thus, surface-active agents which markedly decrease the interfacial tension between oil and water are preferred. Foaming of the finished solution of polymer is frequently undesirable. Thus, surface-active agents which accomplish the above objects without fostering the formation of foam are preferred.

The finely divided inert solids employed in preparing the concentrates and dispersible compositions may be water-soluble or water-insoluble. Representative water-insoluble solids suitable for such use include calcium carbonate, tricalcium phosphate, gypsum, talc, diatomaceous earth, ground limestone, alumina, silica flour, ground phosphate rock and the like. Suitable water-soluble solids include inorganic salts such as mono-, di- and trisodium phosphates, alkali metal sulfates, carbonates, bicarbonates and nitrates and organic salts such as alkali metal acetates, citrates and tartrates.

Any organic liquid can be employed provided it is free flowing, substantially water-free and does not react with the other components of the compositions. Suitable liquids include petroleum distillates, aliphatic alcohols, liquid aromatic hydrocarbons, liquid halohydrocarbons and the like. For my purposes, I prefer to employ as the organic liquid, a petroleum distillate boiling in the kerosene or diesel oil range.

The following are specific examples of the methods and materials used to remove contaminants from wells, shrink or reduce swelling of clays and increase the rate of drilling and production from blocked strata. The ratios indicated are approximate and represent the by weight ratio of acrylamide polymer hydrolyte to circulating medium. The examples also illustrate my compositions comprising detergents or surface-active dispersing agents and their use in preparing aqueous solutions of the flocculating agent.

*Example No. 1*

To a nonproducing well which has been drilled with an oil base drilling fluid was added a solution consisting of 10 pounds of acrylamide polymer hydrolyte and 40 barrels of crude wash oil (ratio 1:1300). This mixture was circulated down through the drill pipe and up the casing until the well was cleaned of mud and sand. After the washing process, fluid flow of from 30 to 60 barrels per day was obtained from the producing strata.

*Example No. 2*

A well which had been drilled with a water base mud and in which the oil sand was mudded and water blocked with filtrate was treated with a solution consisting of 30 pounds of acrylamide polymer hydrolyte and 40 barrels of a mixture of fresh and salt water (ratio 1:475). This solution was circulated down through the drill pipe and up the casing for 2 hours. The washing was repeated in the same manner. The second washings were noticeably cleaner than the first. After treatment, an oil flow of 9 to 10 barrels per day was obtained.

*Example No. 3*

A water supply well which had been producing mudded water was washed by dumping and bailing 5 batches of a solution consisting of ½ pound acrylamide polymer hydrolyte and 2 barrels of fresh water (ratio 1:1400). This mixture was dumped on the bottom of the hole, agitated with a bailer and bailed out. The process was repeated five times. After treatment, the well was clean and produced clear water.

*Example No. 4*

To a newly drilled nonproducing well from which the drilling mud had been bailed was added a solution consisting of 1 pound of acrylamide polymer hydrolyte and 4.2 barrels water (ratio of 1:1500). This solution was poured into the well and agitated against the oil sand strata for 20 minutes by pulling a bailer through the fluid. The solution was then removed from the well by bailing. The operation was repeated six times, decreasing amounts of mud and sand being found in the consecutive batches, the sixth batch being relatively clear of all solids. After being trated by this process, the well made 11 barrels of oil and 2 barrels of water per day.

*Example No. 5*

To the injection well of an injection well system, the efficiency of which had been reduced by swelling clay, was added a solution consisting of 1 and ½ pounds of acrylamide polymer hydrolyte and 337 barrels of fresh water (ratio 1:80,000) at the pressure normally used for the system in order to shrink clays in the injection well sands. As a result of this treatment, the injection rate was increased 23 and ½ percent over that of the previous day at the same pressure.

*Example No. 6*

Prior to cementing the hole of a well passing through water producing strata and having a wall cake of drilling mud, a solution consisting of 1 pound of acrylamide polymer hydrolyte and 100 barrels of fresh water (ratio 1:35,000) was circulated thoroughly through the hole. This mixture was removed from the well by circulating. Further tests indicated that the wall cake had been removed and the well had been cleaned of mud and cuttings. The well was then cemented and flow of water from the water producing strata shut off.

*Example No. 7*

To a well having a hole plugged with sand was added 1 and ½ pounds of acrylamide polymer hydrolyte. This compound in a suitable container was attached to the bottom of a bailer and the bailer was lowered into the well and dropped against the sand plug causing the container carrying the acrylamide polymer hydrolyte to break. The bailer was then worked against the sand plug by alternately raising and dropping until the plug started to puddle. After twenty minutes of working the bailer penetrated the plug and the sand plug was removed. Previous efforts to remove the plug by working the bailer against it had failed prior to the addition of acrylamide polymer hydrolyte.

*Example No. 8*

In a well being drilled through shale strata, it was found that the shale swelled when contacted by water and slowed the drilling operation. A tank was piped up and filled with a 0.5 percent by weight solution of acrylamide polymer hydrolyte connected so as to introduce the polymer hydrolyte solution at the suction side of the pump employed for circulating the water used as the circulating drilling fluid in the well. In this operation about 30 barrels of circulating fluid was introduced into the well hole per hour and the acrylamide polymer hydrolyte was added thereto at the rate of 1 pound of said hydrolyte per hour. It was found that the drilling proceeded about 30 percent more rapidly and with about 30 percent less wear on the drill bits as compared to the rate of drilling and bit wear encountered in an offset well drilled through the same strata by conventional methods without the use of the acrylamide polymer hydrolyte.

*Example No. 9*

50 pounds of acrylamide polymer hydrolyte (characterized by a viscosity of about 8 centipoises for an aqueous 0.5 percent by weight solution thereof at 21.5° C. and having about 5 percent of its carboxamide groups hydrolyzed to carboxyl groups) was ground to a powder passing through a screen of 50 meshes to the inch and blended mechanically with 15 pounds of finely divided diatomaceous earth. The resulting mixture was added with stirring to 19 pounds of diesel oil to produce a slurry. To this slurry was added 16 pounds of surface-active dispersing agent (prepared by condensing dibutylphenol with ethylene oxide in the proportions of 10 moles of ethylene oxide per mole of the phenol) to produce a water-dispersible composition.

To prepare an aqueous treating solution of acrylamide polymer hydrolyte for use in well washing or drilling, a portion of the above-described water-dispersible composition was diluted with an equal weight of diesel oil with stirring. Four pounds of the resulting diluted composition was poured into a stream of water running into a 50 gallon barrel. The barrel was then filled with water and the contents stirred with a plank for about one minute. A uniform solution of the acrylamide polymer hydrolyte was obtained free of gels or agglomerates of undissolved polymer. When the finely ground polymer alone was poured into water directly in a similar operation, agglomerates of polymer formed and a uniform solution was only obtained after several hours of vigorous mechanical agitation with a power mixer.

*Example No. 10*

91 grams of acrylamide polymer hydrolyte similar to that of Example No. 9 was blended with 27 grams of finely divided calcium carbonate, 35 grams of diesel oil and 29 grams of the surface-active dispersing agent of Example 9 to produce a water-dispersible composition. This composition was poured into 10 gallons of water in a 12-gallon container while stirring gently with a large, long-handled spoon. The adddition of the composition took about 0.5 minute and stirring was continued for an additional 0.5 minute after the addition was completed. The resulting aqueous mixture was allowed to stand for 10 minutes and was then found to be a uniform solution of the acrylamide polymer hydrolyte.

The above operation was repeated with equal weights of finely divided diatomaceous earth, pozzolana, alumina, silica flour or monosodium phosphate substituted for the calcium carbonate above. Equally successful dissolution of the polymer in water was obtained.

*Example No. 11*

Following the procedure of Example 10, 91 grams of acrylamide polymer hydrolyte (Separan 2610) was blended with 27 grams of diatomaceous earth, 29 grams of the dibutylphenol-ethylene oxide condensate and 35 grams of kerosene to produce a water-dispersible composition which produced a uniform polymer solution when stirred into water. Compositions having similar desirable properties were prepared substituting toluene, xylene, crude oil of 25.2° or 30.7° API gravity or butanol for the kerosene in the above mixture.

Similarly useful water-dispersible compositions were obtained when any of the following dispersing agents were substituted for the phenol-ethylene oxide condensate in the above formulations, namely:

(1) A product prepared by condensing one mole of propanolamine with 16 moles of propylene oxide and 23 moles of ethylene oxide.

(2) A product prepared by condensing one mole of ricinoleic acid with 40 moles of ethylene oxide (Emulphor EL 719).

(3) Dioctyl sodium sulfosuccinate (Aerosol OT).

(4) Sodium 2-methyl-7-ethyl-4-hendecyl sulfate.

(5) A condensation product of one mole of a long chain fatty acid amide with 50 moles of ethylene oxide (Ethomid HT/60).

*Example No. 12*

A concentrate was prepared by blending 91 parts by weight of acrylamide polymer hydrolyte (Separan NP-10, ground to pass a screen having 50 meshes to the inch) with 27 parts of finely divided trisodium phosphate and 29 parts of "All" brand household detergent. "All" contains a low-sudsing nonionic surface active agent in admixture with finely divided solid builders. The concentrate was stirred into about 35 parts of No. 1 fuel oil and the resulting slurry poured into 10 gallons of water with gentle stirring. A uniform solution of the acrylamide polymer hydrolyte resulted.

Similar concentrates were prepared substituting capric, lauric, palmitic or stearic acid or disodium dodecyl diphenylether disulfonate for the "All" brand detergent in the above formulation. Likewise, successful concentrates were prepared substituting finely divided sodium sulfate, sodium carbonate or potassium nitrate for the trisodium phosphate in the formulation.

It will be apparent that similar compositions will also be useful in preparing aqueous solutions of other synthetic, water-soluble, organic polymers such as polyacrylic acid salts, polyvinyl alcohol, sulfonated polystyrene and the like.

From the above examples it will be apparent that the present well washing process may be used advantageously for a wide variety of purposes. Since all drilling rigs are provided with pumping and bailing equipment, no special facilities are required to introduce the washing solution into the well. Since the circulating medium is normally available at all well sites and the ratio of acrylamide polymer hydrolyte to circulating medium is relatively small, only a minimum of premixing or special handling is required.

By the method shown, wells may be conveniently and economically treated to remove material contaminants, clean sand strata, control clay swelling and increase the rate of drilling.

Having fully described my invention, it is to be understood that I do not wish to be limited to the details set forth, but my invention is of the full scope of the appended claims.

I claim:

1. A well washing process, the steps comprising: introducing into the well a mixture of acrylamide polymer hydrolyte and a circulating medium and removing said mixture from said well through the well bore, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 percent to about 10 percent of the amide groups of the polymer replaced by carboxyl groups.

2. A well washing process for removing mud and the like from a hole, the steps comprising: introducing into the well a mixture of acrylamide polymer hydrolyte and a circulating medium, agitating said mixture in the hole and removing said mixture from the well through the well bore, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 percent to about 10 percent of the amide groups of the polymer replaced by carboxyl groups.

3. A well washing process for shrinking clay in sand strata in an injection well system, the steps comprising: introducing into the well a mixture of acrylamide polymer hydrolyte and an injection fluid, and forcing said mixture through said sand strata, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 percent to about 10 percent of the amide groups of the polymer replaced by carboxyl groups.

4. A well washing process for removing contaminants from sand strata, the steps comprising: introducing successive batches of a mixture of acrylamide polymer hydrolyte and a circulating medium into the well, agitating said mixture through said sand strata, removing each batch through the well bore prior to the introduction of the successive batch and repeating until the sand strata is substantially free of contaminants, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 percent to about 10 percent of the amide groups of the polymer replaced by carboxyl groups.

5. A well washing process, the steps comprising: introducing into the well a mixture of acrylamide polymer hydrolyte, cationic detergent, and a circulating medium, agitating said mixture in the hole and removing said mixture from the well through the well bore, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 percent to about 10 percent of the amide groups of the polymer replaced by carboxyl groups.

6. A well washing process, the steps comprising: introducing into the well during the drilling thereof a mixture of acrylamide polymer hydrolyte and a circulating medium, contacting the drilling bit and freshly drilled strata with the mixture, and removing at least a portion of the resulting mixture from the well, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 percent to about 10 percent of the amide groups of the polymer replaced by carboxyl groups.

7. In a well wherein production of a desired fluid is inhibited by the deposition of clay on the walls thereof, a process which comprises the steps of introducing into the well a mixture of a circulating medium and an acrylamide polymer hydrolyte, said polymer hydrolyte being of high molecular weight, characterized by a viscosity of at least 4 centipoises for an aqueous 0.5 percent by weight solution thereof in distilled water adjusted to a pH of 3.5 and a temperature of 21.5° C. and having from about 0.8 to about 10 percent of the amide groups of the polymer replaced by carboxyl groups, agitating said mixture in the hole so as to contact the clay on the producing faces of the well and removing at least a portion of said mixture from the well through the well bore.

References Cited in the file of this patent

UNITED STATES PATENTS

| | | |
|---|---|---|
| 2,324,254 | Bertness et al. | July 13, 1943 |
| 2,338,372 | Wright | Jan. 4, 1944 |
| 2,718,497 | Oldham | Sept. 20, 1955 |
| 2,752,317 | Sudekum | June 26, 1956 |
| 2,801,982 | Fuchs | Aug. 6, 1957 |
| 2,827,964 | Sandiford | Mar. 25, 1958 |
| 2,854,407 | Mallory | Sept. 30, 1958 |
| 2,867,584 | Scott | Jan. 6, 1959 |
| 2,885,358 | Reddie | May 5, 1959 |

FOREIGN PATENTS

| | | |
|---|---|---|
| 761,021 | Great Britain | Nov. 7, 1956 |

OTHER REFERENCES

"Chemicals in Drilling Mud," by Dr. George R. Gray, Oil and Gas Journal, Dec. 15, 1958, vol. 56, No. 50, pages 90–98 inclusive.